(12) United States Patent
Kim et al.

(10) Patent No.: US 9,411,488 B2
(45) Date of Patent: Aug. 9, 2016

(54) DISPLAY APPARATUS AND METHOD FOR CONTROLLING DISPLAY APPARATUS THEREOF

(71) Applicant: SAMSUNG ELECTRONICS CO., LTD., Suwon-si (KR)

(72) Inventors: Jung-geun Kim, Suwon-si (KR); Dong-heon Lee, Seoul (KR); Sung-hyun Jang, Seoul (KR); Jae-kwon Kim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 91 days.

(21) Appl. No.: 14/135,708

(22) Filed: Dec. 20, 2013

(65) Prior Publication Data
US 2014/0189601 A1    Jul. 3, 2014

(30) Foreign Application Priority Data

Dec. 27, 2012 (KR) .......................... 10-2012-0155216

(51) Int. Cl.
*G06F 13/00* (2006.01)
*G06F 15/00* (2006.01)
*G06F 3/0481* (2013.01)
*G06F 3/01* (2006.01)
(Continued)

(52) U.S. Cl.
CPC ............ *G06F 3/04812* (2013.01); *G06F 3/017* (2013.01); *G06F 3/038* (2013.01); *H04N 5/4403* (2013.01); *H04N 21/4223* (2013.01); *H04N 21/42204* (2013.01); *H04N 21/431* (2013.01); *H04N 21/44218* (2013.01); *H04N 21/47* (2013.01); *H04N 21/4221* (2013.01); *H04N 2005/4428* (2013.01); *H04N 2005/4432* (2013.01)

(58) Field of Classification Search
CPC ........................... G06F 3/017; H04N 21/4223
USPC ........................ 715/733, 716, 767, 810, 863
See application file for complete search history.

(56) References Cited

U.S. PATENT DOCUMENTS 6,204,837 B1    3/2001    Smith
7,839,385 B2    11/2010    Hunleth et al.
(Continued)

FOREIGN PATENT DOCUMENTS

EP    0737911 A1    10/1996
EP    2161652 A1    3/2010
(Continued)

OTHER PUBLICATIONS

Communication dated Mar. 25, 2014, issued by the European Patent Office in counterpart European Application No. 13199312.3.
(Continued)

*Primary Examiner* — Kevin Nguyen
(74) *Attorney, Agent, or Firm* — Sughrue Mion, PLLC (57) ABSTRACT

A display apparatus and a method for controlling a display apparatus thereof are provided. The method for controlling the display apparatus includes: receiving a mode start command from one of a plurality of input units to control a pointer; determining a type of an input unit through which the mode start command is input; and displaying the pointer on a display screen based on a result of the determining. Accordingly, a user may perform the functions of the display apparatus more conveniently according to each input apparatus.

22 Claims, 9 Drawing Sheets

(51) Int. Cl.
*G06F 3/038* (2013.01)
*H04N 5/44* (2011.01)
*H04N 21/422* (2011.01)
*H04N 21/4223* (2011.01)
*H04N 21/431* (2011.01)
*H04N 21/442* (2011.01)
*H04N 21/47* (2011.01)

(56) References Cited

U.S. PATENT DOCUMENTS

| | | | |
|---|---|---|---|
| 8,169,405 | B2 | 5/2012 | Hunleth et al. |
| 8,432,358 | B2 | 4/2013 | Hunleth et al. |
| 2006/0184966 | A1 | 8/2006 | Hunleth et al. |
| 2009/0115723 | A1 | 5/2009 | Henty |
| 2010/0302151 | A1 | 12/2010 | Bae et al. |
| 2011/0067068 | A1 | 3/2011 | Hunleth et al. |
| 2012/0159330 | A1 | 6/2012 | Jeong et al. |
| 2012/0194427 | A1* | 8/2012 | Lee et al. .................. 345/157 |
| 2012/0204210 | A1 | 8/2012 | Hunleth et al. |
| 2013/0033644 | A1* | 2/2013 | Kim et al. .................. 348/563 |
| 2013/0088419 | A1 | 4/2013 | Kim et al. |
| 2013/0208135 | A1* | 8/2013 | Han et al. .................. 348/211.9 |
| 2013/0232417 | A1 | 9/2013 | Hunleth et al. |

FOREIGN PATENT DOCUMENTS

| | | |
|---|---|---|
| EP | 2244166 A2 | 10/2010 |
| EP | 2262235 A1 | 12/2010 |
| JP | 2008-536196 A | 9/2008 |
| KR | 10-2010-0129629 A | 12/2010 |
| KR | 10-2012-0068253 A | 6/2012 |

OTHER PUBLICATIONS

Search Report dated Apr. 18, 2014, issued by the International Searching Authority in counterpart International Application No. PCT/KR2013/012034.

Written Opinion dated Apr. 18, 2014, issued by the International Searching Authority in counterpart International Application No. PCT/KR2013/012034.

Communication dated Jul. 28, 2015, issued by the European Patent Office in counterpart European Application No. 13199312.3.

"Eee Pad User Manual Charging Your Batteries", Dec. 31, 2011, pp. 1-70, ASUSTeK Computer Inc., Taipei, Taiwan XP055203831.

* cited by examiner

DISPLAY APPARATUS AND METHOD FOR CONTROLLING DISPLAY APPARATUS THEREOF

CROSS-REFERENCE TO RELATED APPLICATIONS

This application claims priority from Korean Patent Application No. 10-2012-0155216, filed in the Korean Intellectual Property Office on Dec. 27, 2012, the disclosure of which is incorporated herein by reference in its entirety.

BACKGROUND

1. Field

Apparatuses and methods consistent with exemplary embodiments relate to a display apparatus and a method for controlling a display apparatus thereof, and more particularly, to a display apparatus which is capable of controlling a pointer displayed on a display screen using a plurality of input units and a method for controlling a display apparatus thereof.

2. Description of the Related Art

A display apparatus provides not only the function of receiving broadcasting but also various types of functions such as a video call function, a web browsing function, playing a game function, etc. As a display apparatus provides various types of functions, there is difficulty in controlling the display apparatus using only the buttons of a remote controller. In order to resolve this problem, related art display apparatuses are designed to control various types of functions using a pointer.

However, the related art display apparatus controls a pointer in the same way regardless of a type of an input apparatus. For example, the display apparatus displays only a pointer on a display screen, regardless of whether the pointer is controlled using a remote controller with a touch screen or using a user's motion. If a remote controller is used to control a pointer, a user may easily adjust channels or volumes without using the pointer. However, if a user's motion is used to control the pointer, it is not easy for a user to control channels or volumes without separate icons, and thus, the user needs to use a remote controller again in order to control channels or volumes.

Accordingly, there exists a need for a display apparatus which is capable of controlling a pointer based on the characteristics of each input apparatus.

SUMMARY

The exemplary embodiments provide a display apparatus which provides different User Interfaces (UIs) according to a type of input apparatus to control a pointer so that the pointer is controlled based on the characteristics of each input apparatus and a controlling method thereof.

According to an aspect of an exemplary embodiment, there is provided a method for controlling a display apparatus, the method including: receiving a mode start command from one of a plurality of input units to control a pointer; determining a type of input unit through which the mode start command is input; and, displaying the pointer on a display screen based on a result of the determining.

The displaying may include, if the mode start command is input through a first input unit from among the plurality of input units, displaying the pointer on the display screen, and if the mode start command is input through a second input unit from among the plurality of input units, displaying the pointer and at least one guide UI on the display screen.

The displaying may include, when a predetermined time is elapsed after the mode start command is input through the second input unit, removing the displayed at least one guide UI from the display screen.

The method may include, when, after the removing, the pointer is moved to one of areas where the at least one guide UI has been displayed according to a user's motion input through the second input unit, displaying an item corresponding to the at least one guide UI which has been displayed on the area where the pointer is moved.

The at least one guide UI may include at least one of a guide UI to generate a volume control icon, a guide UI to generate a channel control icon, a guide UI to check a message, a guide UI to guide recommended contents, a guide UI to guide a function corresponding to a user's motion, and a guide UI to convert a mode to a mode for providing contents.

The at least one guide UI may display a part of the item corresponding to the at least one guide UI.

The at least one guide UI may be displayed on an outer area of the display screen.

The method may further include, if the mode start command is input through a third input unit from among the plurality of input units, displaying the pointer and guide UIs of which number is different from that of the at least one guide UI on the display screen.

The first input unit may be a remote controller to control the display apparatus, the second input unit may be a motion input unit to obtain information regarding a user's motion by photographing the user's motion, and the third input unit may be a mouse.

According to an aspect of another exemplary embodiment, there is provided a display apparatus, the display apparatus including: a receiver which receives a user command to control a pointer from a plurality of input units; a display screen which displays the pointer; and a controller which determines a type of the input unit through which the mode start command is input and displays the pointer on the display screen based on a result of the determination.

The controller, if the mode start command is input through a first input unit from among the plurality of input units, may control the display screen to display the pointer on the display screen, and if the mode start command is input through a second input unit from among the plurality of input units, may control the display screen to display the pointer and at least one guide UI.

The controller, when a predetermined time is elapsed after the mode start command is input through the second input unit, may control the display screen to remove the displayed at least one guide UI.

The controller, when a user's motion is input through the second input unit after the at least one guide UI is removed, may control the display screen to move the pointer according to the user motion, and when the pointer is moved to one of areas where the at least one guide UI has been displayed according to the user's motion, may control the display screen to display an item corresponding to the at least one guide UI which has been displayed on the area where the pointer is moved.

The at least one guide UI may include at least one of a guide UI to generate a volume control icon, a guide UI to generate a channel control icon, a guide UI to check a message, a guide UI to guide recommended contents, a guide UI to guide a function corresponding to a user's motion, and a guide UI to convert a mode to a mode for providing contents.

The at least one guide UI may display a part of the item corresponding to the at least one guide UI.

The at least one guide UI may be displayed on an outer area of the display screen.

The controller, if the mode start command is input through a third input unit from among the plurality of input units, may control the display screen to display the pointer and guide UIs of which number is different from that of the at least one guide UI on the display screen.

The first input unit may be a remote controller to control the display apparatus, the second input unit may be a motion input unit to obtain information regarding a user's motion by photographing the user's motion, and the third input unit may be a mouse.

According to an aspect of another exemplary embodiment, there is provided a controlling method of an image processing apparatus, the controlling method including: when a mode start command is received from one of a plurality of input units, determining a type of input unit through which the mode start command is input; and controlling the image processing apparatus to display a pointer on a display screen based on a result of determining.

BRIEF DESCRIPTION OF THE DRAWINGS

The above and/or other aspects will be more apparent by describing certain exemplary embodiments thereof with reference to the accompanying drawings, in which.

DETAILED DESCRIPTION OF THE EXEMPLARY EMBODIMENTS

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
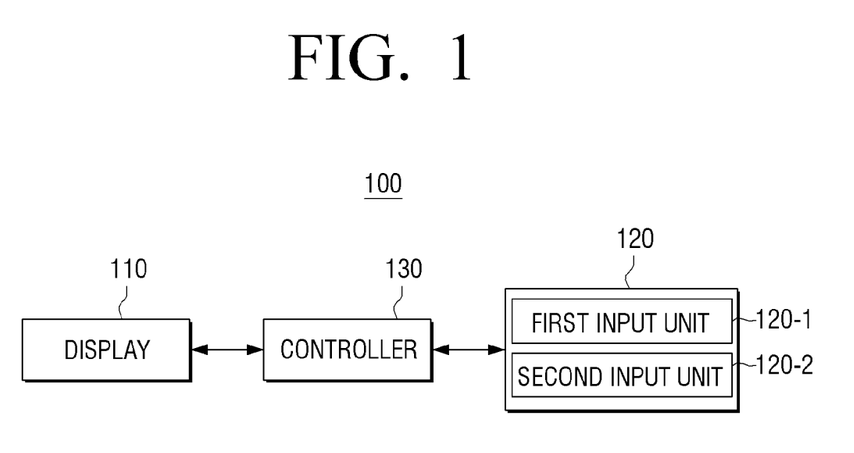
FIG. 1 is a block diagram illustrating configuration of a display apparatus briefly according to an exemplary embodiment.

FIG. 1 is a block diagram illustrating configuration of a display apparatus 100 according to an exemplary embodiment. Referring to FIG. 1, the display apparatus 100 comprises a display 110, an input unit 120, and a controller 130. The input unit 120 comprises a first input unit 120-1 and a second input unit 120-2. While not restricted thereto, the display apparatus 100 according to an exemplary embodiment may be a digital television (TV). The display apparatus 100 may be realized as various types of display apparatuses including a personal computer (PC), a projection television, a tablet PC, a mobile phone, etc.

The display 110 displays various image data under the control of the controller 130. In particular, in a mode to control the functions of the display apparatus 100 using a pointer, the display 110 may display a pointer. In addition, the display 110 may display an item corresponding to at least one guide UI.

The input unit 120 receives a user command to control overall functions of the display apparatus 100. For example, the input unit 120 according to an exemplary embodiment comprises the first input unit 120-1 and the second input unit 120-2 to control a pointer displayed on the display 110. The first input unit 120-1 may be a remote controller including a pointing function, and the second input unit 120-2 may be a motion input unit which receives a user's motion.

The input unit 120 may receive a motion start command to enter into a mode to control a pointer. For example, the mode start command through the first input unit 120-1 may be a command to select a predetermined button on a remote controller, and the motion start command through the second input unit 120-2 may be a user's motion (e.g., a user's motion of waving hands left and right).

The controller 130 controls overall functions of the display apparatus 100 according to a user command through the input unit 120. For example, when a mode start command is input from one of a plurality of input units 120-1, 120-2 to control a pointer on the display 110, the controller 130 determines a type of input unit 120 through which the mode start command is input. If the controller 130 determines that the mode start command is input through the first input unit 120-1 from among a plurality of input units, the controller 130 may display the pointer on the display 110. If the controller 130 determines that the mode start command is input through the second input unit 120-2 from among a plurality of input units, the controller 130 may display the pointer and at least one guide UI on the display 110.

Specifically, if the mode start command is input through the first input unit 120-1, the controller 130 may enter into a first mode where the pointer is controlled using the first input unit 120-1. In the first mode, the controller 130 may display the pointer at the center of the display 110. Subsequently, if a command to move the displayed pointer is input through the first input unit 120-1, the controller 130 may move the displayed pointer according to the command, and if a command to select the pointer is input, the controller 130 may select an item where the pointer is located.

However, if the mode start command is input through the second input unit 120-2, the controller 130 may enter into a second mode where the pointer is controlled using the second input unit 120-2. While the first input unit 120-1 has buttons, the second input unit 120-2 does not have any buttons. Therefore, in order to perform the same functions as those buttons on the first input unit 120-1, the controller 130 may display a pointer and at least one guide UI. Here, the at least one guide UI is a UI to generate an item corresponding to a specific function of the display apparatus 100. While not restricted thereto, the at least one guide UI may include at least one of a guide UI to generate a volume control icon, a guide UI to generate a channel control icon, a guide UI to check a message, a guide UI to guide recommended contents, a guide UI to guide a function corresponding to a user's motion, and a guide UI to convert a mode to a mode for providing contents.

The at least one guide UI may include a part of contents of a corresponding item, but this is only an example. The at least one guide UI may display only a title of the item without any indicator. Further, the at least one guide UI may be displayed on an outer area of the display 110.

If a predetermined time (for example, one second) is passed, the controller 130 may control the display 110 to remove the displayed at least one guide UI on the display 110.

If a command to move a pointer is input through the second input unit 120-2 after the displayed at least one guide UI is removed, the controller 130 may move the displayed pointer according to the command. If the pointer is moved to an area where the at least one guide UI has been displayed according to the command, the controller 130 may control the display 110 to display an item corresponding to the at least one guide UI which has been displayed on the area where the pointer is moved. For example, if the pointer is moved to an area where a guide UI for generating a volume control icon has been displayed, the controller 130 may control the display 110 to display the volume control icon on the area.

If y the item is displayed, the controller 130 may perform a function corresponding to the item using the item. For example, if the volume control icon is displayed, the controller 130 may adjust the volume of the display apparatus 100 using the displayed volume control icon.

As described above, the display apparatus 100 operates differently according to the type of an input apparatus to control a pointer. Therefore, a user may control the display apparatus 100 more conveniently according to the characteristics of the input apparatus.

Figure 2:
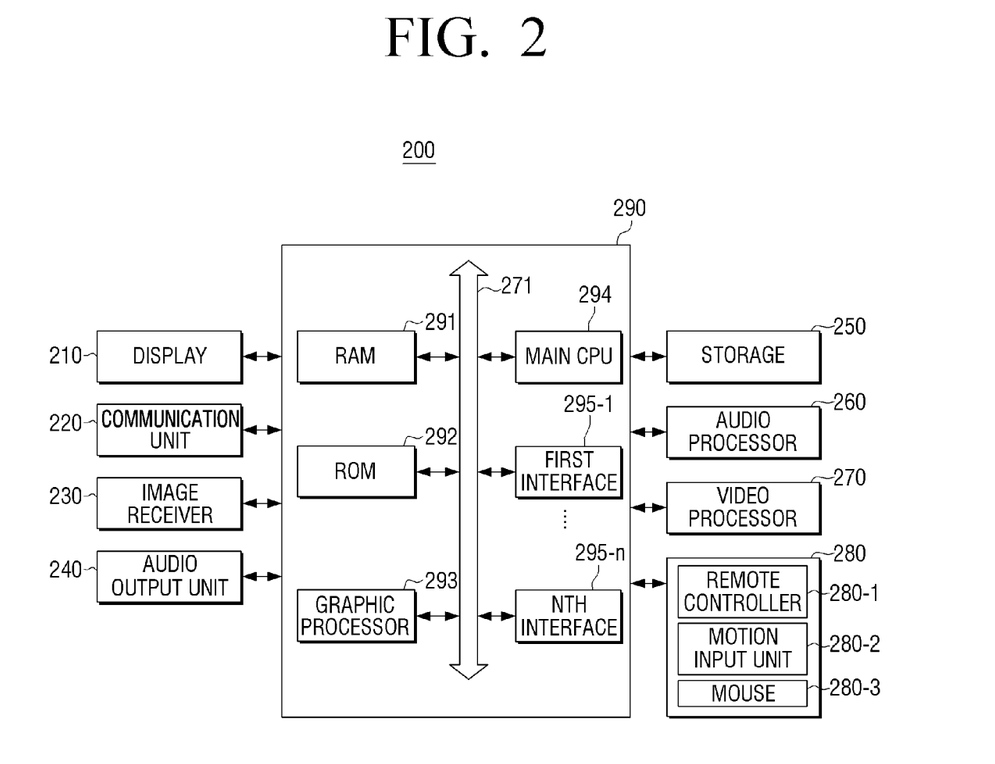
FIG. 2 is a block diagram illustrating configuration of a display apparatus in detail according to an exemplary embodiment.

Hereinafter, a display apparatus will be explained in greater detail with reference to FIGS. 2 to 8. Referring to FIG. 2, the display apparatus 200 comprises a display 210, a communication unit 220, an image receiver 230, an audio output unit 240, a storage 250, an audio processor 260, a video processor 270, an input unit 280, and a controller 290.

Although FIG. 2 illustrates components in the display apparatus 200 for providing various types of functions including a communication function, a broadcast reception function, a video reproduction function, and a display function, the exemplary embodiments are not limited thereto. Therefore, some of the components illustrated in FIG. 2 may be omitted or changed, or other components may be added, depending on exemplary embodiments.

The display 210 displays at least one of a video frame which is generated by a video processor 270 and various images which are generated by a graphic processor 293. In particular, the display 210 may display a pointer to control the functions of the display apparatus 200. In addition, the display 210 may display at least one guide UI and an item according to a type of the input unit 280 which controls the pointer.

The communication unit 220 performs communication with various types of external apparatuses according to various types of communication methods. The communication unit 220 may comprise various communication chips including a WiFi chip, a Bluetooth chip, an Near Field Communication (NFC) chip, a wireless communication chip, etc., Here, the WiFi chip, the Bluetooth chip, and the NFC chip perform communication according to a WiFi method, a Bluetooth method, and an NFC method, respectively. The NFC chip refers to a chip which operates according to the NFC method which uses 13.56 MHz RF-ID frequency band from among various RF-ID frequency bands, such as 135 kHz, 13.56 MHz, 433 MHz, 860~960 MHz, 2.45 GHz, etc. When the WiFi chip or the Bluetooth chip is used, various connection information such as SSID (Service Set Identification), session key, etc. is received/transmitted in advance so that communication can be performed using the same and various information can be received/transmitted. The wireless communication chip refers to a chip which performs communication according to various communication standards, such as IEEE (Institute of Electrical and Electronics Engineers), Zigbee, 3G (3rd Generation), 3GPP (3rd Generation Partnership Project), LTE (Long Term Evolution), etc.

The image receiver 230 receives image data from various sources. For example, the image receiver 230 may receive broadcast data from an external broadcasting station, and may receive image data from an external apparatus (for example, a DVD apparatus).

The audio output unit 240 outputs not only various audio data processed by the audio processor 260 but also various alarm sounds or voice messages.

The storage 250 stores various modules to operate the display apparatus 200. For example, the storage 250 may store software including a base module, a sensing module, a communication module, a presentation module, a web browser module, and a service module, etc. Here, the base module is a basic module which processes a signal transmitted from hardware included in the display apparatus 200 and transmits the processed signal to an upper layer module. The sensing module collects information from various sensors, analyzes and manages the collected information, and may include a face recognition module, a voice recognition module, a motion recognition module, an NFC recognition module, etc. The presentation module is a module to compose a display screen, and may include a multimedia module to reproduce and output multimedia contents and a UI rendering module to perform UI and graphic processing. The communication module is a module to perform communication with outside. The web browser module is a module to access a web server by performing web browsing. The service module is a module including various applications to provide various services.

As described above, the storage 250 may include various types of program modules, but some of the various types of program modules may be omitted, changed, or added according to the type and characteristics of the display apparatus 200. For example, if the display apparatus 200 is realized as a tablet PC, the basic module may further include a determination module to determine a GPS-based location, and the sensing module may further include a sensing module to sense the operation of a user.

The audio processor 260 performs processing with respect to audio data. The audio processor 260 may perform various processing including a decoding, an amplifying, a noise filtering, etc. with respect to audio data. The audio data processed by the audio processor 260 may be output to the audio output unit 240.

The video processor 270 processes image data received from the image receiver 230. The video processor 270 may perform various image processing including a decoding, a scaling, a noise filtering, a frame rate conversion, a resolution conversion, etc. with respect to image data.

The input unit 280 receives a user command to control overall operations of the display apparatus 200. In particular, the input unit 280 according to an exemplary embodiment may control a pointer displayed on the display 210, and may comprise a remote controller 280-1, a motion input unit 280-2, and a mouse 280-3.

The remote controller 280-1 may include a plurality of buttons to control the functions of the display apparatus 200 and a touch screen to control a pointer. If a user's touch is input on the touch screen, the remote controller 280-1 may transmit information regarding a location where the user's touch is input to the controller 290. The controller 290 may move the pointer displayed on the display 210 based on the information regarding the location where the user's touch is input. If a selection command (for example, touch twice in a row) is input on the touch screen, the remote controller 280-1 may transmit the selection command to the controller 290. Subsequently, the controller 290 may select an item where the pointer is located.

Although the remote controller according to an exemplary embodiment may receive a user's manipulation using a touch screen on the remote controller, but this is only an example. The technical feature of the exemplary embodiment may also be applied to a remote controller having a pointing device function.

The motion input unit 280-2 receives an image signal photographing a user's motion (for example, successive frames) and provides the image signal to the controller 290. For example, the motion input unit 280-2 may be realized as a camera unit including a lens and an image sensor. In addition, the motion input unit 280-2 may be realized as an integral part of the display apparatus 200, or as a separate component from the display apparatus 200. The motion input unit 280-2 which is formed separately from the display apparatus 200 may be connected via cable or wirelessly.

If a user's motion is input through the motion input unit 280-2, the controller 290 recognizes the motion using a motion sensing module stored in the storage 250. The motion recognition may be performed by dividing an image corresponding to the user's motion input through the motion input unit 280-2 (for example, successive frames) into a background area and a hand area (for example, an area where a hand is open or clenched), and by recognizing the successive movement of the hand using the motion recognition module. If the user's motion is input, the controller 290 stores the received image by frame unit, and senses an object of the user's motion (for example, a user's hand) using the stored frames. The controller 290 detects the object by sensing at least one of a shape, a color, and a movement of the object included in the frames. The controller 290 may trace the movement of the detected object using a location of each object included in the frames.

The controller 290 determines a motion according to the shape and movement of the traced object. For example, the controller 290 determines the user's motion using at least one of changes in the shape of the object, a speed, a location, and a direction. While not restricted thereto, the user's motion includes a 'grab' which is the motion of clenching a hand, a 'pointing move' which is the motion of moving a displayed cursor using a hand, a 'slap' which is the motion of moving a hand in one direction at higher than a certain speed, a 'shake' which is the motion of shaking a hand left/right or up/down, and a 'rotate' which is the motion of rotating a hand. However, the technical feature of the present invention may also be applied to other motions that the above-described motions. For example, the user's motion may further include a 'spread' which is the motion of spreading a clenched hand.

In order to determine whether a user's motion is the 'pointing move' or the 'slap', the controller 290 determines whether an object is moved beyond a predetermined area (for example, a square of 40 cm×40 cm) within a predetermined time (for example, 800 ms). If the object is not moved beyond the predetermined area within the predetermined time, the controller 290 may determine that the user's motion is the 'pointing move'. However, if the object is moved beyond the predetermined area within the predetermined time, the controller 290 may determine that the user's motion is the 'slap'. In another example, if it is determined that the speed of an object is less than a predetermined speed (for example, 30 cm/s), the controller 290 may determine that the user's motion is the 'pointing move'. If it is determined that the speed of the object is greater than the predetermined speed, the controller 290 determines that the user's motion is the 'slap'.

As described above, the controller 290 may control the display apparatus 200 using a recognized motion. For example, the controller 290 may control the display apparatus 200 including at least one of the functions, such as switching channels, adjusting volume, reproducing contents (for example, video, music, photo, etc.), and internet browsing, etc.

The mouse 280-3 is connected to the display apparatus 200 via cable or wirelessly so as to receive a pointer movement command or a pointer selection command.

The input unit 120 may receive a mode start command to enter into a mode to control a pointer. Here, the mode start command through the remote controller 280-1 may be a command to select a predetermined button on the remote controller 280-1, the mode start command through the motion input unit 280-2 may be a user's motion (for example, the motion of shaking the hand left and right a plurality of times), and the mode start command through the mouse 280-3 may be an operation of connecting to the display apparatus 200.

The controller 290 may control the overall operations of the display apparatus 200 using various programs stored in the storage 250.

As illustrated in FIG. 2, the controller 290 comprises a RAM 291, a ROM 292, a graphic processor 293, a main CPU 294, first to nth interface 295-1~295-n, and a bus 296. In this case, the RAM 291, the ROM 292, the graphic processor 293, the main CPU 294, and the first to nth interface 295-1~295-n may be connected to each other through the bus 296.

The ROM 292 stores a set of commands for system booting. If a turn-on command is input and power is supplied, the main CPU 294 copies an O/S stored in the storage 250 according to a command stored in the ROM 292 and executes the O/S to boot the system. Once the system booting is completed, the main CPU 294 copies various application programs stored in the storage 250 and performs various operations by executing the application programs copied in the RAM 291.

The graphic processor 293 generates an image including various objects such as icon, image, text, etc. using an operator (not shown) and a renderer (not shown). The operator calculates property values such as coordinates, a shape, a size, a color, etc. of the image where each object is displayed according to a layout of a screen using a control command received from the input unit 280. The renderer generates a screen of various layouts including an object based on the property values calculated by the operator. The screen generated by the renderer is displayed within a display area of the display 210.

The main CPU 294 performs booting using the O/S stored in the storage 250 by accessing the storage 250. In addition, the main CPU 294 performs various operations using various programs, contents, data, and etc. stored in the storage 250.

The first to nth interface 295-1 to 295-n are connected to the above-described various components. One of the interface may be a network interface which is connected to an external apparatus through network.

In particular, if a mode start command is input from one of a plurality of input units 280-1, 280-2, 280-3, the controller 290 may determine a type of an input unit through which the mode start command is input. For example, if the mode start command is input from the remote controller 280-1, the controller 290 may convert a mode of the display apparatus 200 to a remote controller control mode where a pointer on the display is controlled using the remote controller 280-1. If the mode start command is input through the motion input unit 280-2, the controller 290 may convert the mode of the display apparatus 200 to a motion control mode where the pointer on the display is controlled using a user's motion input to the motion input unit 280-2. If the mode start command is input through the mouse 280-3, the controller 290 may convert the mode of the display apparatus 200 to a mouse control mode.

Figure 3:
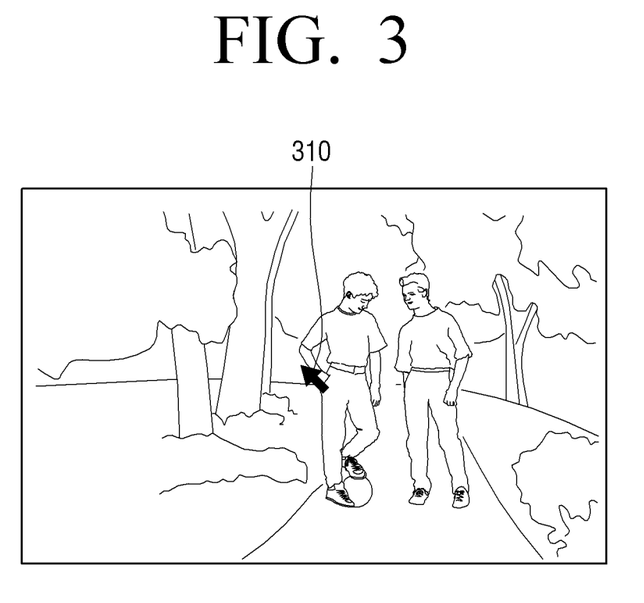
FIG. 3 is a view provided to explain a mode to control a pointer using a remote controller according to an exemplary embodiment.

If the mode of the display apparatus 200 is converted to the remote controller control mode, the controller 290 may control the display 210 to display a pointer 310 at the center of the display screen, as illustrated in FIG. 3. In this case, if the displayed pointer is controlled by the remote controller, an additional guide UI is not displayed on the display screen since the remote controller has a plurality of buttons to perform the functions of the display apparatus 200 (for example, controlling volume, switching channels, etc.) and various functions of the display apparatus 200 (for example, selecting an item) may be performed using only the pointer.

Figure 4:
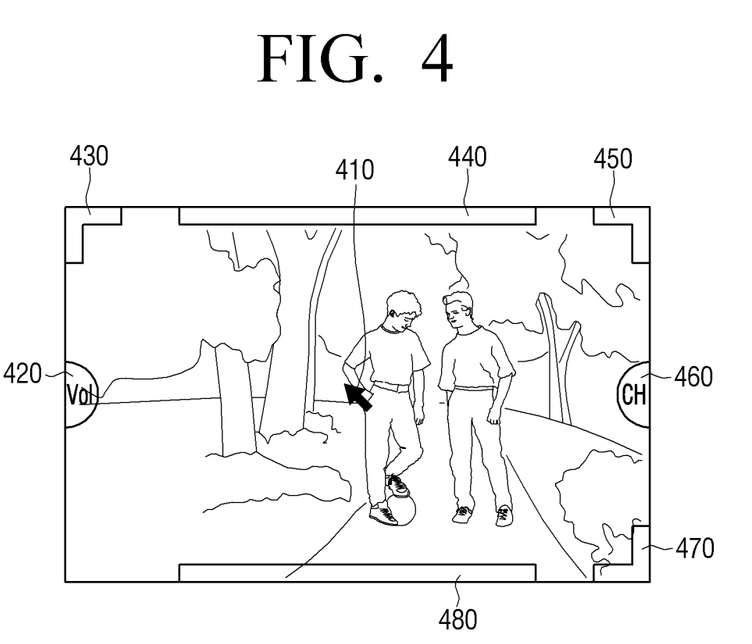
FIGS. 4 to 7 are views provided to explain a mode to control a pointer using a motion input unit according to an exemplary embodiment.

If the mode is converted to the motion control mode, the controller 290 may control the display 210 to display a pointer 410 at the center of the display screen and to display a plurality of guide UIs 420 to 480 at the outer sides (e.g., at the corner) of the display screen, as illustrated FIG. 4. In this case, the plurality of guide UIs may be UIs for performing a specific function of the display apparatus 200 or generating an item.

A plurality of guide UIs may include a guide UI 420 to generate a volume control icon, a guide UI 430 to move to the previous screen, a guide UI 440 to check a message, a guide UI 450 to convert a mode to a mode for providing contents, a guide UI 460 to generate a channel control icon, a guide UI 470 to guide a function corresponding to a user's motion, and a guide UI 480 to guide recommended contents. For convenience of description, although the guide UIs may include the above-described UIs in the exemplary embodiment, it is understood that another exemplary embodiment is not limited thereto. For example, the plurality of guide UIs may include various UIs, such as a UI to generate an electronic manual, a UI to generate a channel list, etc.

A guide UI may not display a separate indicator, and may display the function of the display apparatus 200 or a title of an item corresponding to the guide UI. For example, The guide UI 420 to generate a volume control icon and the guide UI 460 to generate a channel control icon may display "Vol" and "CH" representing each function, but the UI 430 to move to the previous screen, the guide UI 440 to check a message, the guide UI 450 to a mode to a mode for providing contents, the guide UI 470 to guide a function corresponding to a user's motion, and the guide UI 480 to guide recommended contents may not display the indicator.

The guide UI according to an exemplary embodiment may display a part of the item.

Figure 5:
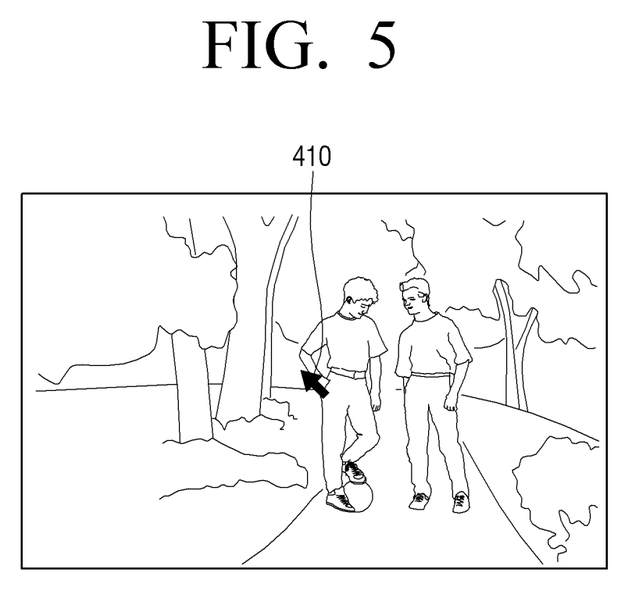

If a predetermined time (for example, 1 second) is elapsed after the pointer 410 and the plurality of guide UIs 420 to 480 are displayed, the controller 290 may control the display 210 to remove the displayed plurality of guide UIs from the display screen so that only the pointer 410 remains on the display screen, as illustrated in FIG. 5.

Subsequently, if a user's motion is input through the motion input unit 280-2, the controller 290 may move the displayed pointer according to the user's motion. If the pointer is moved to one of the areas where the plurality of guide UIs 420 to 480 are displayed according to the user's motion, the controller 290 may control the display 210 to display the item corresponding to the guide UI which has been displayed on the area where the pointer is moved.

Figure 6:
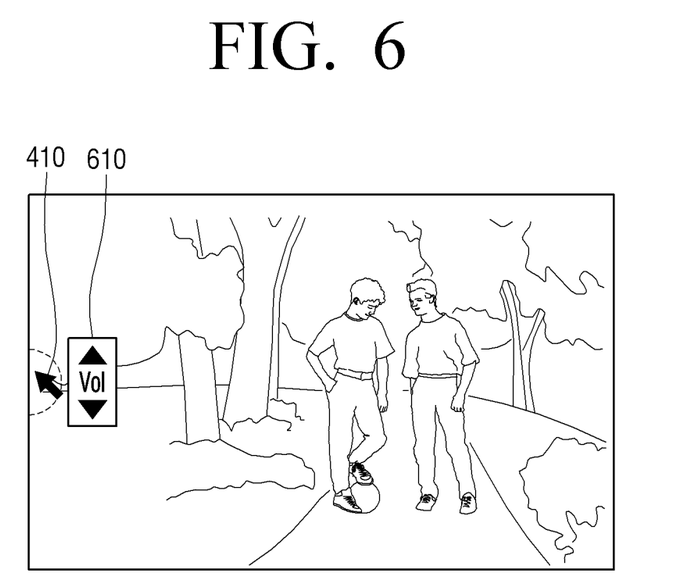

For example, if the pointer 410 is moved to the area where the guide UI 420 to generate a volume control icon has been displayed, the controller 290 may control the display 210 to display a volume control icon 610, as illustrated in FIG. 6. In this case, the volume control icon 610 may include a volume up icon, a volume down icon, and current volume information.

If the pointer 410 is moved to the volume up icon according to the user's motion input through the motion input unit 280-2, and a selection command is input through the motion input unit 280-2, the controller 290 may increase the volume. Alternatively, if the pointer 410 is moved to the volume down icon according to the user's motion input through the motion input unit 280-2, and a selection command is input through the motion input unit 280-2, the controller 290 may decrease the volume.

If a volume control command is not input through the volume control icon 610 for a predetermined time (for example, 10 seconds), the controller 290 may control the display 210 to remove the volume control icon 610 from the display screen.

Figure 7:
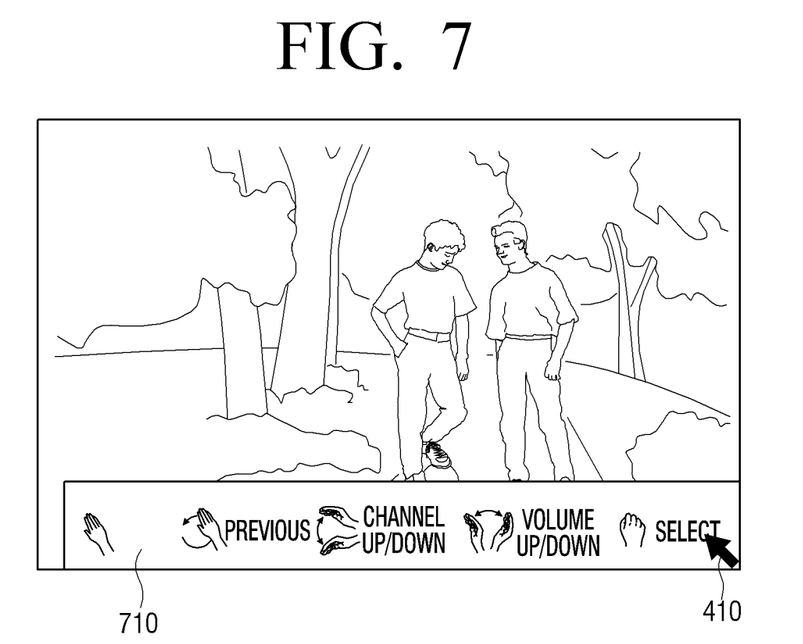

If the pointer 410 is moved to the area where the guide UI 470 to guide a function corresponding to the user's motion has been displayed, the controller 290 may control the display 210 to display motion guide information 710, as illustrated in FIG. 7. The motion guide information 710 may display the functions performed by the display apparatus 200 according to the user's motion. In this case, the controller 290 may control the display 210 to generate the guide UI 470 to guide a function corresponding to the user's motion such that a size of the guide UI 470 is magnified gradually as it approaches the left side.

As described above, if the display apparatus 200 is controlled through the motion input unit 280-2, the pointer 410 and the plurality of guide UIs 420 to 480 are displayed so that a user may perform the functions of the display apparatus 200 without using any additional input apparatus.

Figure 8:
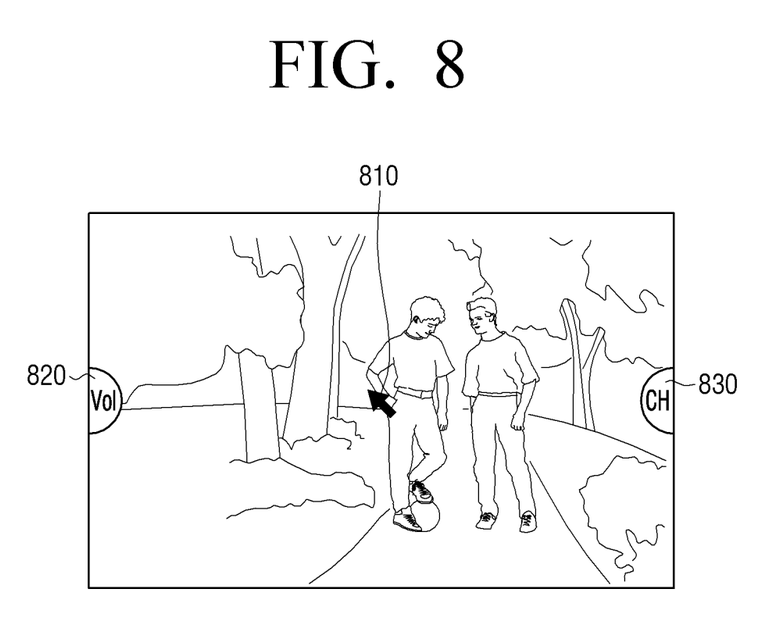
FIG. 8 is a view provided to explain a mode to control a pointer using a mouse according to an exemplary embodiment.

If a mode is converted to the mouse control mode, the controller 290 may control the display 210 to display a pointer 810 at the center of the display screen, and to display a guide UI 820 to generate a volume control icon 820 and a guide UI 830 to generate a channel control icon outside of the display screen, as illustrated in FIG. 8. That is, if the mode is converted to the mouse control mode, the guide UIs of which number is less than that of motion control mode may be displayed.

As described above, the guide UIs are displayed differently according to a type of the input unit 280 to control a pointer on the display and a user may perform various functions of a display apparatus 200 using the pointer according to the characteristics of the input apparatus.

Hereinafter, the method for controlling the display apparatus 100 will be explained with reference to FIG. 9.

Figure 9:
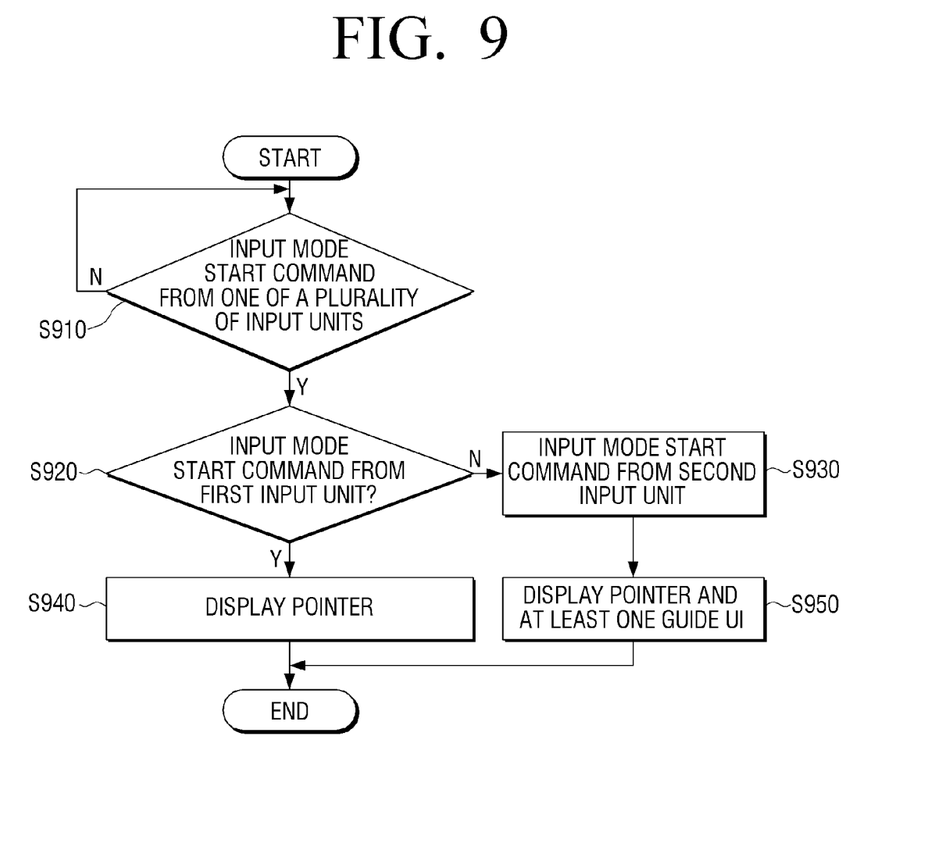
FIG. 9 is a flowchart provided to explain the method for controlling a display apparatus according to an exemplary embodiment.

Referring to FIG. 9, the display apparatus 100 receives a mode start command from one of a plurality of input units 120-1, 120-2 (operation S910). In this case, the mode start command received through the first input unit 120-1 may be a command to select a predetermined button on a remote controller, and the mode start command received through the second input unit 120-2 may be a user's motion (for example, the motion of shaking a hand a plurality of times).

Subsequently, the display apparatus 100 determines whether the mode start command is received from the first input unit 120-1 (operation S920). In this case, the first input unit 120-1 may be a remote controller.

If the mode start command is input from the first input unit 120-1 (operation S920—Y), the display apparatus 100 displays a pointer at the center of a display screen (operation S940). The display apparatus 100 may control the pointer using the first input unit 120-1.

If the mode start command is not input from the first input unit 120-1 (operation S920—N), the display apparatus 100 determines that the mode start command is input from the second input unit 120-2 (operation S930).

If the mode start command is input from the second input unit 120-2, the display apparatus 200 displays the pointer and at least one guide UI on the display screen (operation S950). In this case, the at least one guide UI may be a UI to perform the functions of the display apparatus 100 or to generate an item. For example, the at least one guide UI according to an exemplary embodiment may include a guide UI to generate a volume control icon, a guide UI to move to the previous screen, a guide UI to check a message, a guide UI to convert a mode to a mode for providing contents, a guide UI to generate a channel control icon, a guide UI to guide a function corresponding to a user's motion, and a guide UI to guide recommended contents.

While the above-described exemplary embodiments relate to a display apparatus, it is understood that other exemplary embodiments are not limited thereto. For example, one or more other exemplary embodiments may relate to an image processing apparatus such as a set-top box, a stand-alone control device, an audio/video receiver, an optical media player, an image source, etc.

While not restricted thereto, an exemplary embodiment can be written as computer programs and can be implemented in general-use digital computers that execute the programs using a non-transitory computer readable medium which stores a program including the step of receiving a mode start command from one of a plurality of input units to control a pointer, the step of displaying the pointer when a mode start command is input through the first input unit from among the plurality of input units, and the step of displaying the pointer and at least one guide UI on the display screen when a mode start command is input through the second input unit from among the plurality of input units may be provided.

Examples of the non-transitory computer readable recording medium include magnetic storage media (e.g., ROM, floppy disks, hard disks, etc.) and optical recording media (e.g., CD-ROMs, or DVDs). Also, the exemplary embodiments may be written as computer programs transmitted over a computer-readable transmission medium, such as a carrier wave, and received and implemented in general-use digital computers that execute the programs. Moreover, while not required in all aspects, one or more units of the display apparatus illustrated in FIG. 2 can include a processor or microprocessor executing a computer program stored in a computer-readable medium.

The foregoing embodiments and advantages are merely exemplary and are not to be construed as limiting the present inventive concept. The present teaching can be readily applied to other types of apparatuses. Also, the description of the exemplary embodiments of the present inventive concept is intended to be illustrative, and not to limit the scope of the inventive concept as defined by the following claims, and many alternatives, modifications, and variations will be apparent to those skilled in the art.

What is claimed is:

1. A method for controlling a display apparatus, the method comprising:
   receiving a mode start command from one of a plurality of input units to control a pointer;
   determining a type of an input unit through which the mode start command is input; and
   displaying the pointer on a display screen based on a result of the determining,
   wherein the displaying comprises, if the mode start command is input through a first input unit from among the plurality of input units, displaying the pointer only on the display screen, and if the mode start command is input through a second input unit from among the plurality of input units, displaying the pointer and at least one guide user interface (UI) on the display screen.

2. The method as claimed in claim 1, wherein the displaying comprises, when a predetermined time is elapsed after the mode start command is input through the second input unit, removing the displayed at least one guide UI from the display screen.

3. The method as claimed in claim 2, further comprising:
   when, after the removing, the pointer is moved to one of areas where the at least one guide UI has been displayed according to a user's motion input through the second input unit, displaying an item corresponding to the at least one guide UI which has been displayed on the area where the pointer is moved.

4. The method as claimed in claim 1, wherein the at least one guide UI includes at least one of a guide UI to generate a volume control icon, a guide UI to generate a channel control icon, a guide UI to check a message, a guide UI to guide recommended contents, a guide UI to guide a function corresponding to a user's motion, and a guide UI to convert a mode to a mode for providing contents.

5. The method as claimed in claim 1, wherein the at least one guide UI displays a part of the item corresponding to the at least one guide UI.

6. The method as claimed in claim 5, wherein the part of the item is a title of the at least one guide UI.

7. The method as claimed in claim 1, wherein the at least one guide UI is displayed on an outer area of the display screen.

8. The method as claimed in claim 1, further comprising:
   when a mode start command is input through a third input unit from among the plurality of input units, displaying the pointer and guide UIs of which number is different from that of the at least one guide UI on the display screen.

9. The method as claimed in claim 8, wherein the first input unit is a remote controller to control the display apparatus, the second input unit is a motion input unit to obtain information regarding a user's motion by photographing the user motion, and the third input unit is a mouse.

10. A display apparatus, comprising:
    a receiver configured to receive a user command to control a pointer from a plurality of input units;
    a display screen configured to display the pointer; and
    a controller configured to determine a type of the input unit through which the mode start command is input and to display the pointer on the display screen based on a result of the determination,
    wherein the controller controls the display screen to display the pointer only on the display screen, if the mode start command is input through a first input unit from among the plurality of input units, and controls the display screen to display the pointer and at least one guide UI, if the mode start command is input through a second input unit from among the plurality of input units.

11. The apparatus as claimed in claim 10, wherein the controller, when a predetermined time is elapsed after the mode start command is input through the second input unit, controls the display screen to remove the displayed at least one guide UI.

12. The apparatus as claimed in claim 11, wherein the controller, when a motion is input through the second input unit after the at least one guide UI is removed, controls the display screen to move the pointer according to the user motion, and when the pointer is moved to one of areas where the at least one guide UI has been displayed according to the user's motion, controls the display screen to display an item corresponding to the at least one guide UI which has been displayed on the area where the pointer is moved.

13. The apparatus as claimed in claim 10, wherein the at least one guide UI includes at least one of a guide UI to generate a volume control icon, a guide UI to generate a channel control icon, a guide UI to check a message, a guide UI to guide recommended contents, a guide UI to guide a function corresponding to a user motion, and a guide UI to convert a mode to a mode for providing contents.

14. The apparatus as claimed in claim 10, wherein the at least one guide UI displays a part of the item corresponding to the at least one guide UI.

15. The apparatus as claimed in claim 14, wherein the part of the item is a title of the at least one guide UI.

16. The apparatus as claimed in claim 10, wherein the at least one guide UI is displayed on an outer area of the display screen.

17. The apparatus as claimed in claim 10, wherein the controller, when a mode start command is input through a third input unit from among the plurality of input units, controls the display screen to display the pointer and guide UIs of which number is different from that of the at least one guide UI on the display screen.

18. The apparatus as claimed in claim 17, wherein the first input unit is a remote controller to control the display apparatus, the second input unit is a motion input unit to obtain information regarding a user's motion by photographing the user's motion, and the third input unit is a mouse.

19. A control method of an image processing apparatus, the control method comprising:
when a mode start command is received from one of a plurality of input units, determining a type of input unit through which the mode start command is input; and
controlling the image processing apparatus to display a pointer on a display screen based on a result of the determining,
wherein the controlling comprises, if the mode start command is input through a first input unit from among the plurality of input units, displaying the pointer only on the display screen, and if the mode start command is input through a second input unit from among the plurality of input units, displaying the pointer and at least one guide UI on the display screen.

20. The method as claimed in claim 19, wherein the at least one guide UI includes at least one of a guide UI to generate a volume control icon, a guide UI to generate a channel control icon, a guide UI to check a message, a guide UI to guide recommended contents, a guide UI to guide a function corresponding to a user's motion, and a guide UI to convert a mode to a mode for providing contents.

21. A non-transitory computer readable recording medium in which a program for executing the method of claim 1 is recorded.

22. A non-transitory computer readable recording medium in which a program for executing the method of claim 19 is recorded.

* * * * *